United States Patent [19]

Krösbacher et al.

[11] Patent Number: 4,606,250
[45] Date of Patent: Aug. 19, 1986

[54] APPARATUS FOR PRODUCING BLANKS FROM A WEB

[75] Inventors: Peter Krösbacher, Fulpmes; Johann Wetzinger, Telfes, both of Austria

[73] Assignee: Eumuco Aktiengesellschaft fur Maschinenbau, Fed. Rep. of Germany

[21] Appl. No.: 758,715

[22] Filed: Jul. 25, 1985

[51] Int. Cl.⁴ .......................... B23D 15/08; B26D 7/06
[52] U.S. Cl. ........................................ 83/161; 83/216; 83/559
[58] Field of Search .................. 83/161, 159, 216, 34, 83/559, 556

[56] References Cited

U.S. PATENT DOCUMENTS 2,962,083 11/1960 Hasselquist ..................... 83/159 X
3,122,042 2/1964 Littell et al. ..................... 83/216 X
4,555,967 12/1985 Jumel .............................. 83/216 X Primary Examiner—Frank T. Yost
Attorney, Agent, or Firm—Diller, Ramik & Wight

[57] ABSTRACT

An apparatus for producing blanks from a web including a pair of relatively movable upper and lower blades for severing therebetween blanks from a web along a predetermined cut line established by cooperative cutting edges of the blades, an end feed path of travel for the web and a discharge path of travel for the blanks, a mechanism for rotating the blades to selectively vary the cutting angle and thereby vary the sizes, shapes and/or cut line orientation of the blanks severed from the web, a transfer mechanism for transferring each severed blank from a position adjacent the blades and the end feed path of travel to a second position at the blank discharge path of travel, the transfer mechanism including a receiving element pivoted to an arm which in turn is pivoted for movement in a generally horizontal plane, the receiving element be accommodated in a recess adjacent the blades and receiving therein each severed blank for transfer to the discharge path of travel.

20 Claims, 6 Drawing Figures

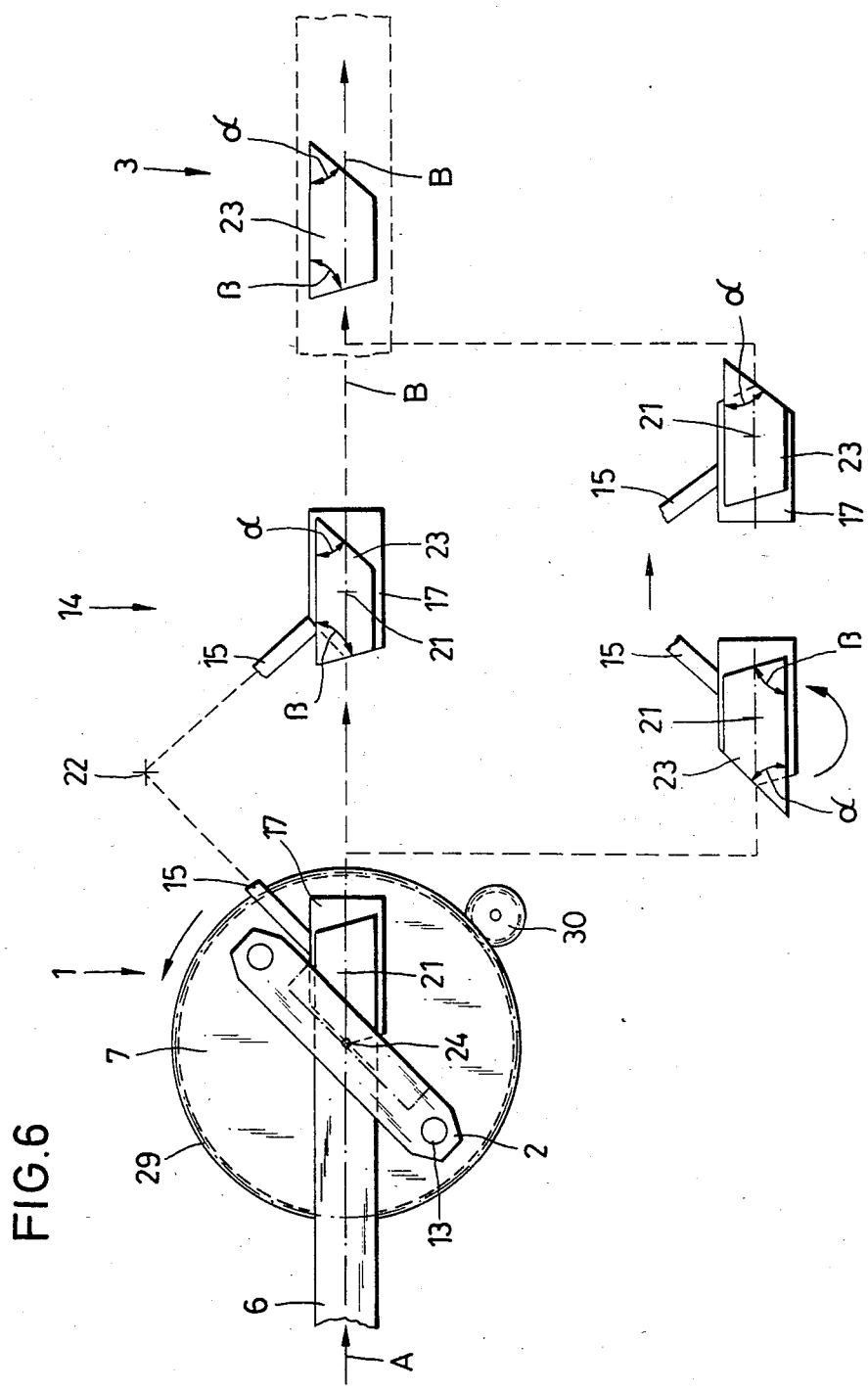

APPARATUS FOR PRODUCING BLANKS FROM A WEB

The present invention is directed to a novel apparatus or system for producing blanks or cropped pieces from a web or billet which may be heated prior to the cyclical operation of the apparatus. The apparatus includes a basic body having a pair of relatively reciprocal upper and lower blades with the upper blade being carried by a vertically movable punch and the lower blade being inclined to the web. A transfer mechanism or conveyor is used to transfer the cropped pieces or severed blanks from the area of the upper and lower blades to a blank discharge path of travel for subsequent feeding to a forming unit.

Conventional systems or apparatus are known for producing heated cropped or severed pieces or blanks as, for example, in AT-B No. 351.337.

It is conventional to uniformly heat a web, billet or bar-shaped feedstock and weld this material to continuously feed a cropping, blanking or severing device having blades or knives which cut the web to a particular contour. If the material is metal, it is normally heated to the forging temperature prior to being severed, and the blades or knives are inclined or angulated relative to the in-feed direction. The pieces thus blanked or severed are then subsequently advanced to a die forging unit for further processing, as, for example, die forging the blanks into screw spanners or wrenches. Normally the web or billet is heated along a path parallel to the cropping or severing direction or obliquely to sections of the billet, and, as a result, problems are created due to unequal elongations of the web or billet creating a deflection thereof and a corresponding displacement of the position of the mutually parallel or coincident cutting lines of the cutting blades. This unequal elongation is normally created because of the variety in the material properties of the billets, bars or like stock which is welded one to another, as well as the different widths or thicknesses thereof. This displacement of the position of the cutting lines has the consequence that at points at which the width of the blank is normally reduced, for instance the transitional narrower region between the enlarged opposite gripping lands or heads of screw spanners or wrenches, the width is additionally reduced. Therefore, the gripping lands or sockets of the spanners or wrenches may break-off during subsequent handling or simply may be cut-off during the blanking or severing operation.

In keeping with the foregoing it is a primary object of the present invention to provide a novel apparatus which in spite of any change in material, the position of the blades under normal operation or any change in the cutting line position between the blades or the workpiece will not adversely affect the cycle of the apparatus or the cyclically blanked or severed workpieces.

The latter objective of the invention is achieved by supporting upper and lower severing or blanking blades for rotation to and at an angle relative to the direction of in-feed of the web or billet and a transfer mechanism for receiving severed blanks or cropped pieces which is also rotatable in response to the angle of the blanking blades so that not only is each blank or workpiece properly severed, but it is also properly and accurately received after severance upon the receiving element and transferred thereby to a discharge path of travel for subsequent delivery to a die forming unit.

The concept of turning two blades to effect cutting lines in different directions with respect to sheet metal cutting presses is disclosed in DE-A No. 2 752 912 where a revolving cutting press is installed ahead of a separating shear used to perform cuts in continuous sheet plate. However, the problems mentioned above do not occur with the cold treatment of material moved in an exact longitudinal path of travel through a sheet plate cutting press. The adjustment of the angle of the two blades relative to the infeed direction creates manufacturing possibilities/alternatives which heretofore were nonexistent. Any deviations from the infeed direction due to unequal material elongations can be compensated for by adjusting the angle of the severing blades relative to the web or billet either to its original setting or whatever alternative setting is required by virtue of a change in the position, elongation, deflection, etc. of the web or billet being blanked or severed.

Another advantage of selectively altering the angle of the severing blades relative to the path of web infeed is to thereby produce blanks having shorter or longer lengths, as desired, which can be effected simply by changing the angle of the blades to that of the direction of workpiece or infeed advancement to create blanks or pieces of different sizes. Systems for cropping or severing pieces to produce different sizes are known (AT-B No. 361 759), but this is performed only by cold working and the delivery path of the material (bars) is necessarily changed and hence requires substantially more space. This these systems operate only at ambient temperatures, the problems of elongation, etc. mentioned at the outset hereof, are non existent.

In further accordance with the present invention the apparatus is so designed as to produce blanks or cropped pieces having non-parallel edges formed by similar cut lines of the associated upper and lower cutting or blanking blades. Furthermore, by simply rotating the blades between cuts or alternate cuts, the web or infeed material can be transformed into triangular and/or trapezoidal blanks without any loss of material. For example, in order to produce trapezoidal blanks from which ploughshares can be made if the apparatus is merely operated in such a fashion that the resultant blanks are alternately rotated through 180° to achieve the trapezoidal configuration thereof. Furthermore, even though the blanks are alternately rotated the transferring mechanism is so constructed that these blanks can be reoriented in but a single position relative to a discharge path of travel for subsequent treatment in an automatic die forging unit which normally accepts workpieces only in a single orientation.

It should also be appreciated that the distance between an associated heating zone for the webs or billets and the severing blades of the blanking device should be reduced in order to keep the heat loss of temperature as low as possible. Due to the arrangement of individually rotatable blades in the cropping device, which as a matter of fact, have to be rotated by the same extent, the width of the cropping device must be relatively large. therefore it is much more favorable to provide a cropping device rotatable about a vertical axis which extends through the longitudinal axis of the material billet. According to the instant embodiment, the mentioned width is restricted to a minimum resulting from the length of the longest cropped piece to be produced plus the bilateral guide range for the cutting punch. Thus, the cropping device is for instance mounted on a round table having a circular slots which are under engaged by fixation elements. The kind of fixation may be adapted to the prevailing conditions. Various possibilities also exist concerning the turning movement of the total cropping device: It may be performed hydraulically or by means of a motor. Preferably the angle of rotation ranges between 45° and 150°.

In further accordance with this invention a transfer mechanism is provided for transferring each blank from beneath the cutting blades to a discharge path of travel, the mechanism including a support arm pivoted about a vertical axis in carrying a receiving element upon which successive blanks are deposited. The arm is rotated or oscillated between the latter-noted two positions mechanically, hydraulically or otherwise, to supply blanks in a cyclical fashion from the stamping or severing area to eventual processing downstream by a die forming unit.

Since the angle of blades relative to the infeed path of travel of the billet or web can be adjusted by relative rotation, the same rotation might necessitate a change in the position of the receiving element which should at all times be generally beneath and aligned with each chopped or severed blank. This alignment is maintained irrespective of the relative position of rotation of the blades by providing a locating recess beneath the blades into which the receiving element is moved by its supporting arm. When the receiving element is fully positioned in the recess it is automatically aligned beneath the severing blades and/or the blank or workpiece formed thereby. Each receiving element is preferably pivoted to the arm by a vertical pivot pin which further assures that it will be aligned when housed in the recess and a biasing spring is also provided to assure that the receiving element will automatically return to a "home" or normal position when moved by the arm to and into the discharge path of travel. Hence, the receiving element will at all times accommodate its position to a position of alignment with the cutting or severing blades, yet will be restored by the biasing means or spring to a position aligned with the discharge path of travel irrespective of the variety of different cutting angles available and the direction of rotation of the supporting arm, be it clockwise or counterclockwise, to accommodate different directions of discharge.

In the case of producing triangular or trapezoidal blanks or pieces, the knives or blades are rotated between alternating angles or cuts resulting in the blanks having oppositely cut edges which are not parallel or nearly parallel to each other or two successive cutting lines. Furthermore, since the cutting blades are rotated between successive cuts or blanks, each successive blank or cropped piece will have a different end leading and when discharged alternating blanks must be appropriately rotated, generally through 180° to insure that each piece will have the same end leading when subsequently conveyed to the die forming unit. The latter is achieved by the present invention through the novel transferring mechanism which can be operated in any of two different directions of rotation or oscillation to achieve the congruent positioning of workpieces to the discharge path of travel and the eventual subsequent feed units of die forming mechanisms.

It is also desirable in keeping with the present invention that all feeding distances to the subsequent forming unit shall be as short as possible, and to maintain uncontrolled movement at a minimum, particularly when gravity effected. Therefore, by providing the receiving element in a receiving recess beneath the lower blade each cropped piece or blank descends under gravity a very minimum distance and can be thus accurately transferred by the receiving element to the discharge path of travel. Preferably the latter includes a discharge chute onto which the blanks are fed by hydraulic ram or plunger, but alternately the receiving element might simply transfer the cropped pieces or blanks in their congruent position upon a conveyor built for subsequent transport to a die forging unit.

With the above, and other objects in view that will hereinafter appear, the nature of the invention will be more clearly understood by reference to the following detailed description, the appended claims and the several views illustrated in the accompanying drawings.

IN THE DRAWINGS

FIG. 6 is a schematic top plan view of another embodiment of the invention, and also illustrates trapezoidal shape workpieces formed by the apparatus.

Figure 1:
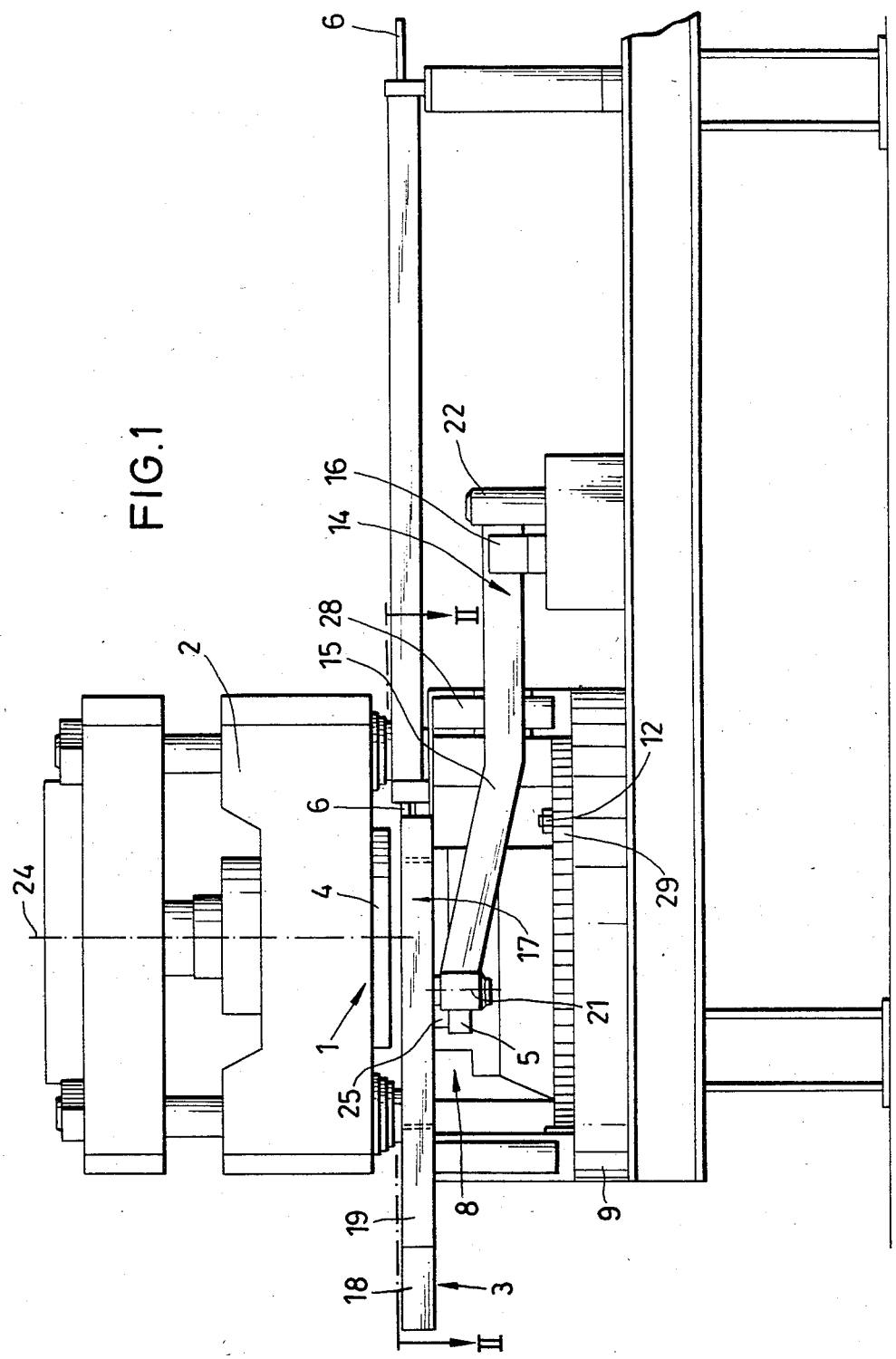
FIG. 1 is a side elevational view of an apparatus for producing blanks from a billet or web in keeping with the present invention, and illustrates a punch for blanking workpieces from a web and a transfer mechanism for moving the workpieces from the blanking station to a discharge path of travel.

A novel apparatus constructed in accordance with this invention for shearing, cropping or blanking workpieces or blanks from a web, billet or the like is fully illustrated in FIGS. 1–4 of the drawings and is generally designated by the reference numeral 1.

Figure 3:
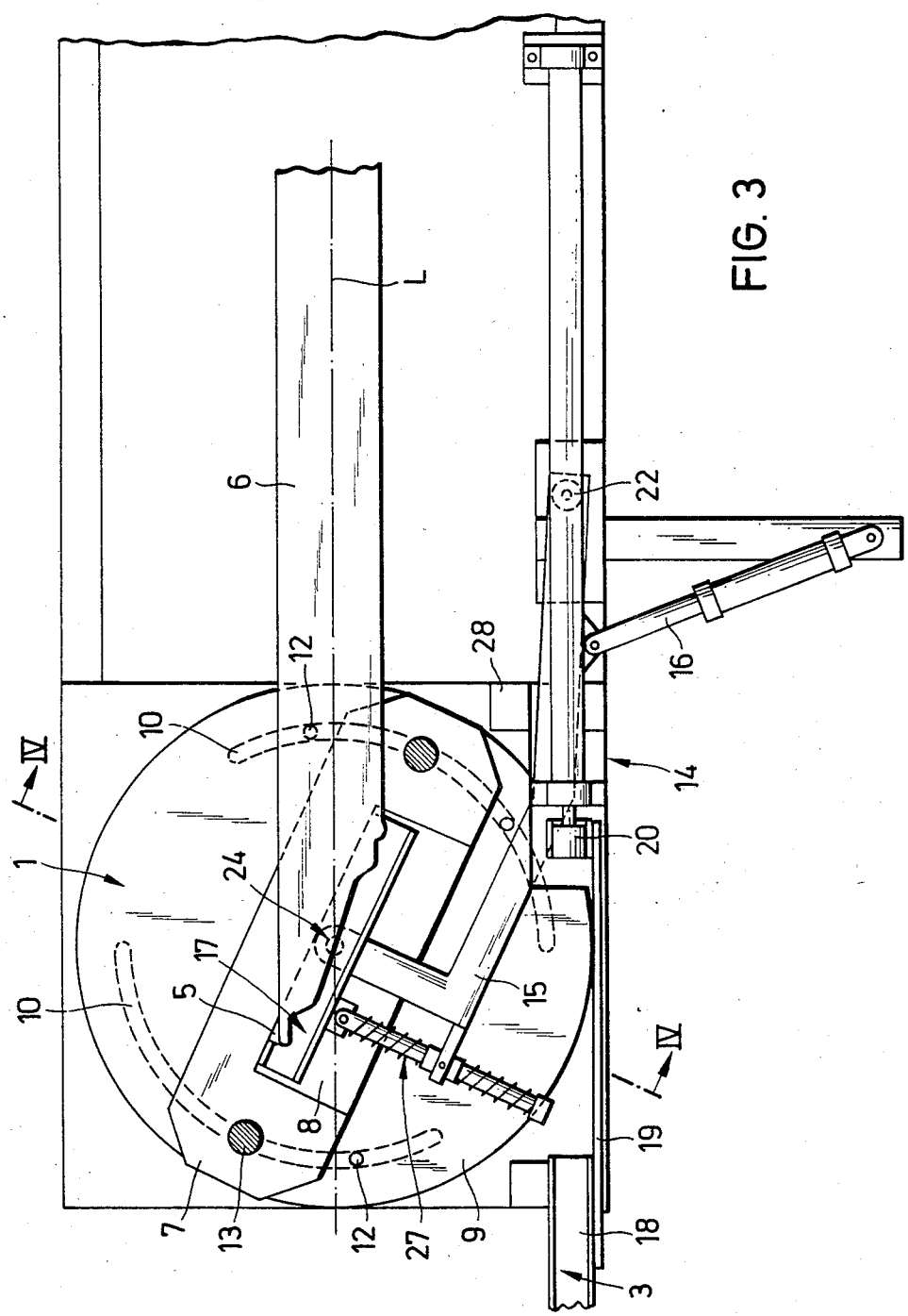
FIG. 3 is a cross-sectional view along line II—II of FIG. 1 and illustrates the receiving element at a position in the blanking area for receiving each workpiece as it is blanked or cut from the web or billet.
Figure 4:
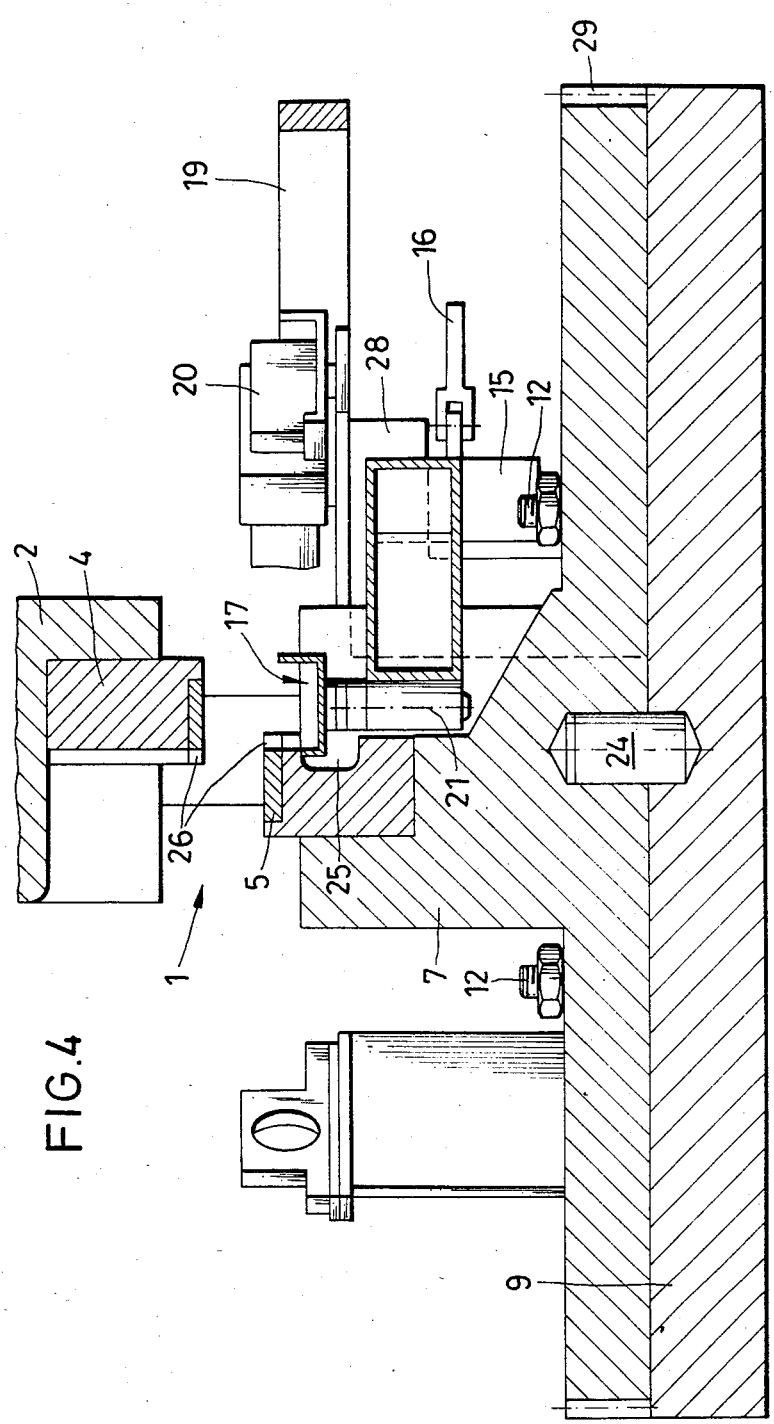
FIG. 4 is a cross-sectional view taken generally along line IV—IV of FIG. 3 and illustrates the receiving element position in the recess adjacent a lower of the blades of the punch or blanking device.

The blanking or cropping apparatus 1 is mounted for rotation upon a round table 9 about a vertical axis or pin 24 (FIGS. 3 and 4).

Figure 2:
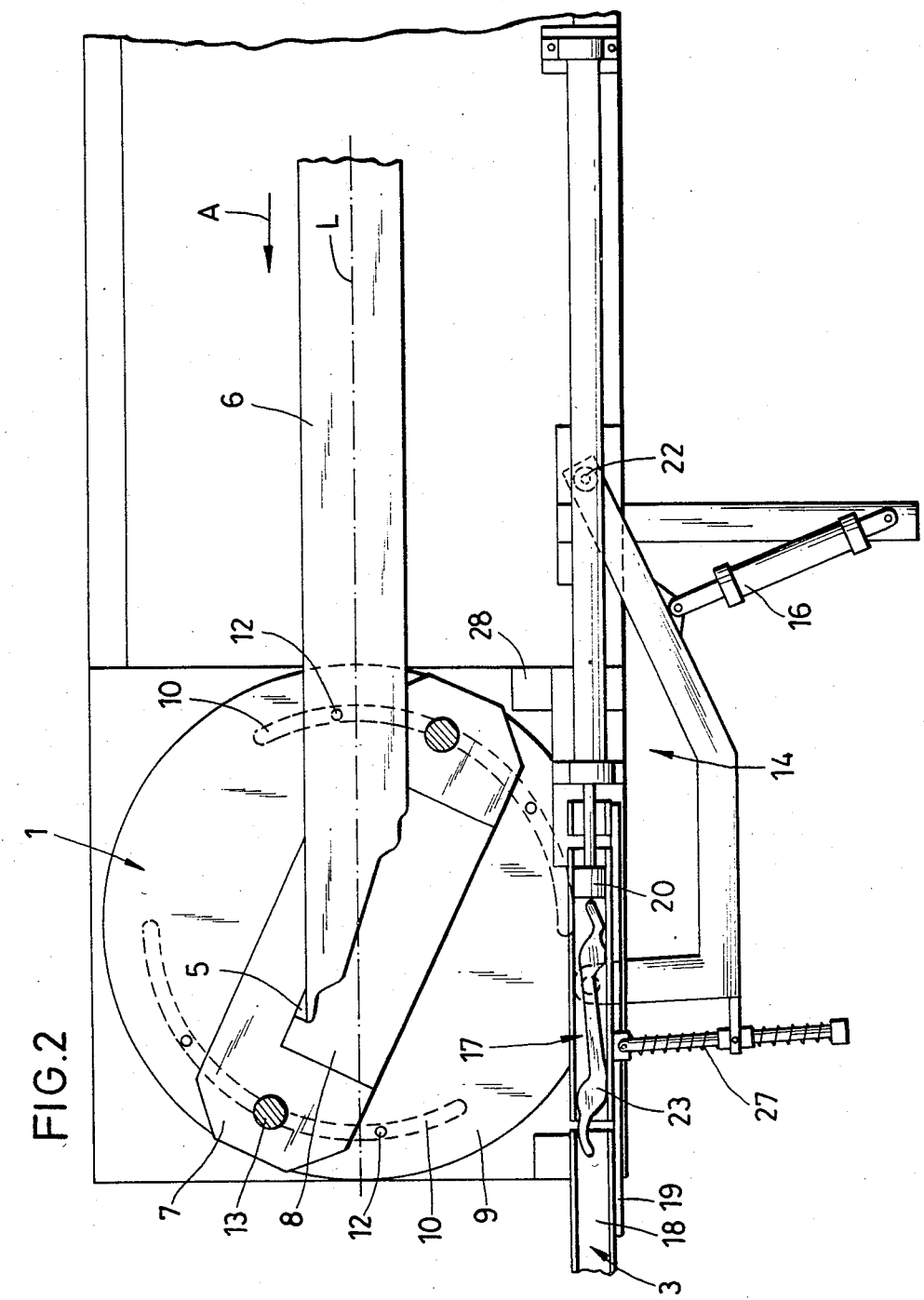
FIG. 2 is cross-sectional view taken generally along line II—II of FIG. 1, and illustrates a receiving element carried by an arm supporting a workpiece in alginment with a ram and a discharge chute.

A body 7 of the blanking apparatus or device 1 has secured thereto a lower blanking or severing blade 5 and a punch 2 is vertically movable thereabove on columns 13 whose lower ends are fixed to the body 7. An upper blanking or severing blade 4 is carried by the punch 2. The punch 2 is reciprocated by hydraulic means (not shown) in a conventional manner in response to horizontal, cyclical advancement of a web, flat material billet, or the like 6 in a predetermined infeed path of travel A (FIG. 2). The axis of rotation or pin 24 of the body 7 extends through the longitudinal axis L of the flat material billet or web 6, as is most evident in FIG. 3. Preferably, the pin 24 is inserted into axially oppositely opening bores (unnumbered) in the body 7 and the table 9, as is best illustrated in FIG. 4. Additionally, the table 9 includes circular or arcuate slots 10 (FIGS. 2 and 3) which open upwardly toward and receive therein downwardly projecting guiding and limiting elements 12. The guiding and limiting elements 12 are simply screws and nuts which can be readily and quickly detached from and locked to the body 7 at any one of a number of selected positions therealong. Thus, as the guiding and limiting elements or pins 12 engage opposite ends of the slots 10 during rotation of the a body 7 relative to the table 9, the extent of clockwise and counterclockwise rotation of the body 7 and the overall device 1 can be selectively adjusted and/or controlled for a purpose to be described more fully hereinafter.

A drive for rotating the body 7 and the entire blanking or cropping apparatus 1 may consist of, for example, a plurality of gear teeth or a gear element (FIG. 5) meshed with peripheral teeth 29 (FIGS. 1, 4 and 5) of the basic body 7. The gear or gear element 30 is simply driven in a conventional manner by a reversing electric motor (not shown). However, the drive for the gear 30 can also be through an appropriate hydraulic mechanism which is also not illustrated.

The lower blade 5 is supported in a recess 8 (FIG. 4) of the body 7. The blade itself also includes a recess 25 adjacent a cutting edge 26 of the lower blade 5. The cutting edges 26 of the blades 4, 5 are curved to blank, sever, or otherwise crop workpieces or blanks 23 (FIG. 2) from the billet or web 6. The workpieces 23 correspond roughly to the contour of the eventually finished products which might be, for example, screw or bolt spanners, wrenches, and similar tools. The blades 4, 5 of the blanking device 1 and the central plan extending through the columns 13 are aligned at an angle to the predetermined infeed path of travel A which might be, for example, 25° in the case of screw spanners. The latter angle is dictated by the width of the web or billet 6 to be processed and by the length of the eventually produced workpieces or blanks 23 whose opposite ends (unnumbered) are additionally, subsequently provided with gripping lands or flats by a conventional die forging unit.

The billet or web 6 may be a single continuous length of metallic web material or a plurality of individual bars previously welded together which is red-heated immediately prior to introduction into the blanking device 1. To this effect an induction heating unit (not shown) is provided preferably to permit billet heating substantially more uniform than possible with the individual heating of the cropped or blanked pieces. Heating is performed in inclined zones extending nearly in parallel to the blanking device 1 so that the billet or web end to be severed to blanked is heated uniformly over its width. Heating as well as varying material properties, widths and thicknesses of the individual welded bars may cause a deflection in the plane of the billet or web 6 so that it may laterally deviate from the direction of travel A. Therefore, the cutting angle or line of cut established by the cutting edges 26, 26 of the blades 4, 5 relative to the infeed direction A and the position of the cutting line of the unchanged blanking device 1 are altered. When the billet or web 6 becomes laterally misaligned the curved cutting edges 26, 26 of the blades 4, 5 create a change of the mutual distance of the cutting lines so that in the narrow regions of the pieces 23 (the transition between the gripping lands) a tapered portion is created which is responsible for the workpieces breaking during subsequent transfer or in use. At the very worst the deflection of the billet 6 and the deterioration of the cut line resulting therefrom creates so narrow a mid portion of the blank workpieces 23 that the same merely break during blanking and/or subsequent transfer. However, such lateral deflection of the billet or web 6 which would otherwise result in undesired deformation of the pieces 23 is detectable, and when detected the blanking or cropping device is simply rotated through a specific angular or arcuate distance to re-establish at any time the desired cutting edge or angle originally selected relative to the infeed direction A. For example, if the angle between the cutting edge established by the edges 26, 26 of the blades 4, 5 to the axis L of the web 6 were 25° originally, and if the web 6 distorted such as to increase or decrease this angle, the device 1 would be simply arcuately rotated to bring the edges 26, 26 and the cut line defined thereby into the original angular relationship to the axis L of the web 6.

The latter rotation of the blanking device 1 also not only adjusts the cutting angle of the edges 26, 26 to the longitudinal axis L of the web 6, but also permits the workpieces 23 to be cut in different lengths to produce shorter or longer workpieces. For example, as the cut line angle is increased the workpiece length is increased and vice versa.

The blanking device 1 also includes means for transferring and conveying each blank or workpiece 23 from a position adjacent the blades after severance to a position more remote from the blades and to a discharge path of travel generally designated by the reference numeral 3. The transferring means is generally designated by the reference numeral 14 and includes a receiving element or tray 17 mounted upon an end (unnumbered) of a support arm 15 which is mounted for pivotal movement in a horizontal plane by means of a vertical pivot pin or axis 22 (FIGS. 1, 2 and 3). In the discharge position of the arm 15 (FIG. 2) the receiving element or chute 17 thereof is aligned with a chute 18 and with a rod or plunger 20 which can be pneumatically reciprocated to the left, as viewed in FIG. 2, to move the workpiece 23 from the receiving chute 17 to the chute 18 along a blank discharge path of travel B. The arm 15 is pivoted between the positions thereof shown in FIGS. 2 and 3 by means of a hydraulic unit 16 suitably connected to the arm 15 and the frame (unnumbered) of the overall device 1. A bar or stop 19 spans the area between the chute 18 and the rod 20 (FIG. 3) and forms a stop for the arm 15 when moved to the position thereof shown in FIG. 2. Thus, when the receiving element 17 is positioned as shown in FIGS. 3 and 4 partially within the recess 25 and beneath the blades 4, 5, each severed or blank workpiece or blank 23 drops upon/into the receiving element 17 and can be transferred from the blanking station position (FIG. 3) to the discharge position (FIG. 2) simply by the arcuate swinging motion of the arm 15 under the influence of the hydraulic unit 16.

It should be appreciated that at any time the overall blanking device 1 and the blades 4, 5 are angularly adjusted relative to the longitudinal center line L of the web 6, the recess 8 is similarly angularly moved concurrently therewith. Therefore, it is necessary that the receiving element or tray 17 be capable of accurate introduction into and alignment with recess 8 and the overlying blades 4, 5 so that irrespective of any cut line angle of the blades 4, 5 relative to the longitudinal axis L, the workpieces 23 will fall into the receiving element 17. To this end, the receiving element 17 is joined to the support arm 15 by the pivot 21 heretofore noted, and when the receiving element 17 is received in the recess 8, irrespective of any arcuate position of the latter relative to the axis L, the receiving element 17 will pivot appropriately about the axis 21 and alin itself automatically in and with the recess 8 underlying the cutting edges 26, 26 of the blades 4, 5. However, then the receiving element 17 is moved to its discharge position (FIG. 2) it must automatically return to a position in alignment with the rod 20 and the chute 18. To this end the arm 15 carries a rod (unnumbered) having biasing springs at opposite ends which automatically return the receiving element 17 to a neutral position in a conventional manner readily apparent from FIG. 2. Quite simply, the rod (unnumbered) carried by the receiving element 17 is slidable in a sleeve (unnumbered) carried by the arm 15 and the two springs 27 biased this rod in opposite directions to return the same to a normal position (FIG. 2) irrespective of whatever position is created when the receiving element 17 is in the recess 8 (FIG. 3). Thus, no matter what the cutting angle defined by the cutting edges 26, 26 relative to the longitudinal axis L of the web or billet 6, the receiving element 17 will automatically adapt thereto when positioned as shown in FIG. 3 and return to its "home" discharge position of FIG. 2 aligned with the rod 20 and the chute 18.

The support arm 15 is also partially inclined downwardly (FIG. 1) in order to enable the same to move beneath the rod 20 and its actuating cylinder (unnumbered). In order to reduce the lateral distance of the offset a support 28 for the cylinder (unnumbered) at its forward end is preferably V-shaped. In this fashion as little space as possible is utilized for the overall blanking device 1.

Figure 5:
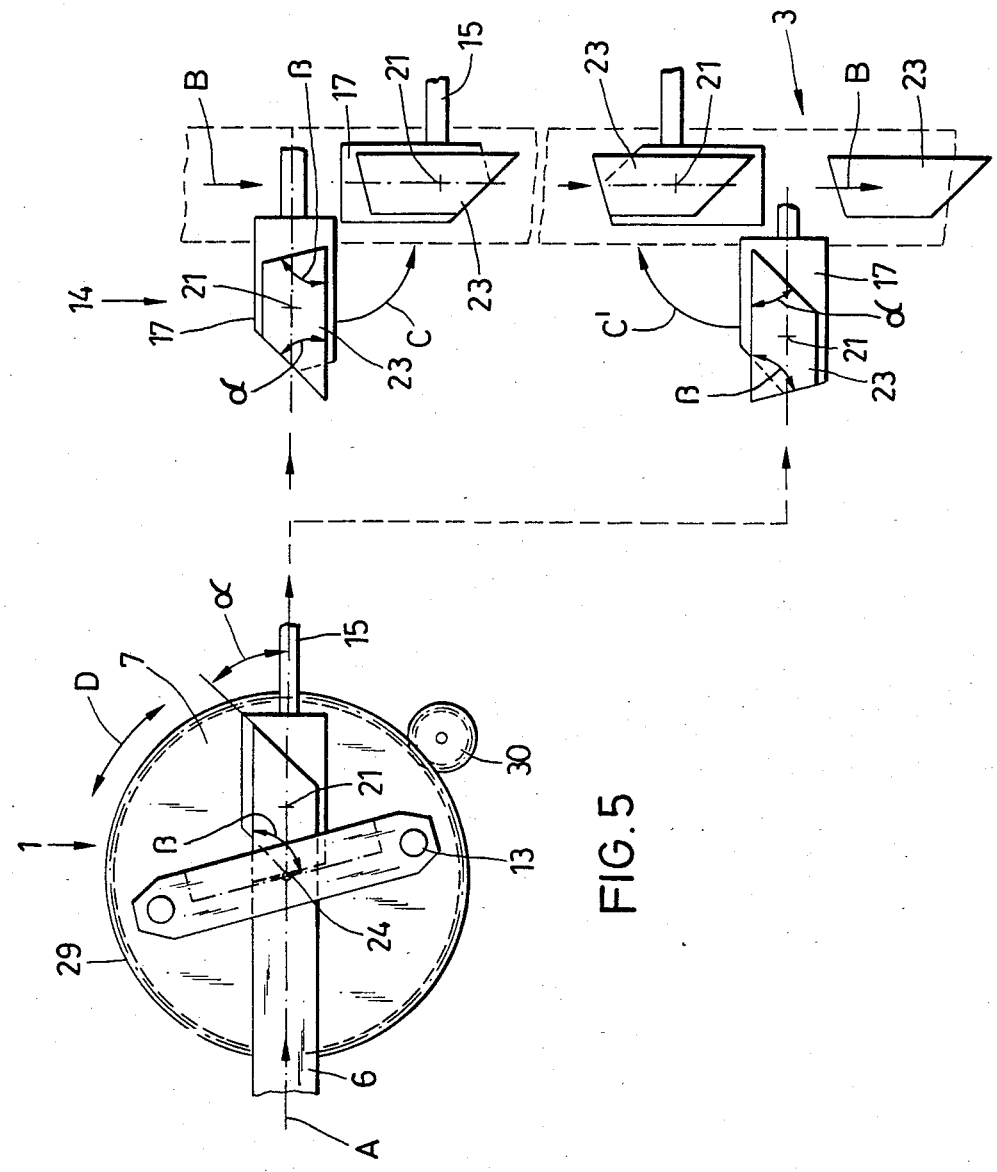
FIG. 5 is a schematic top plan view of another embodiment of the invention, and illustrates the manner in which trapezoidal shape workpieces are cut from a web by appropriately rotating the cutting blades.

FIGS. 5 and 6 illustrate two other embodiments of an apparatus for producing blanks identical to that heretofore described relative to FIGS. 1–4. However, the rotation of the overall blanking device 1 and specifically the body 7 and blades 4, 5 carried thereby is primarily intended to compensate for deformation or change positions of the billet or web 6 relative to the cutting edges 26, 26 or absent such deformation to simply change the cutting angle for forming pieces 23 of shorter or longer lengths. In the case of the embodiments of FIGS. 5 and 6, the blanking devices are intended for producing triangular or trapezoidal workpieces where the cutting or severance lines do not extend in parallel relationship to each other. To this end it is necessary to rotate the blanking or cropping device 1 to take a different position after each cut. Thus, both FIGS. 5 and 6 show two consecutive operational steps in which the workpieces are severed in a non-congruent position and are then subsequently placed into congruent aligned position for subsequent transfer to a forging unit.

Reference is made to FIG. 5 of the drawing in which a workpiece 23 has been severed from a billet or web 6 by being introduced into the blanking device 1 along the predetermined infeed path of travel A. In this case the cutting line or line of severance extends at an angle α to the direction of the infeed path of travel A while the cut line produced in the preceding working cycle is along an angle β relative to the same infeed path of travel direction A. The separated workpieces thus successfully blanked, extend lengthwise in the direction of advancement and each is subsequently deposited in the receiving element 17 when the same is in the receiving position and is thereafter rotated or moved through an arc of approximately 90° (arrow C) into the feeding direction B. Thus the receiving element is turned about the axis 21 on the support arm 15 which may be also rotated from the receiving position to the delivery position of the workpiece 23 to a further conveyor section 3. However, the work bases may be also horizontally displaced in the manner also shown in FIG. 5 upon the separation of the individual workpieces 23 and during the delivery thereof to the discharge path of travel 3. In this case the cropping or blanking device 1 (arrow D) is rotated into a second cutting condition (angle β), the web 6 is advanced, the workpieces then subsequently blanked or severed, and after being received in the receiving element 17, it is turned through 180°, as evidenced by the lower portion of FIG. 5. Thus, as between the upper workpiece 23 and the lower workpiece 23 of FIG. 5, the succeeding pieces are rotated through 180°, but in this manner succeeding workpieces cut from the billet or web 6 can be formed with the same angle edges, α, β, discharged from the blanking device 1, and all that need be done is for the same to be reoriented with the same edge leading for subsequent processing. The latter is achieved by utilizing another transfer mechanism without a blanking device as heretofore described and swivelling one of the pieces through 90° (arrow C). Once this is done each workpiece is positioned in the discharge path of travel direction 3 with the same end (angle α) leading.

In accordance with the embodiment of the invention shown in FIG. 6, the delivery of the workpieces 23 in congruent relationship is achieved by the first of succeeding blanked workpieces being fed without change in leading end to the discharge path of travel 3 while each second or alternating workpieces rotated through 180° during its transport, as shown by the lower portion of the drawing. The transfer mechanisms are, of course, identical to those heretofore described relative to the device 1 including, of course, the supporting arm 15 and the receiving element 17 associated therewith.

Although in a preferred embodiment of the invention as has been specifically illustrated and described herein, it is to be understood that minor variations may be made in the apparatus without departing from the spirit and scope of the invention, as defined in the appended claims.

I claim:

1. Apparatus for producing blanks from a web comprising a pair of relatively movable upper and lower blades for severing therebetween blanks from a web along a predetermined cut line established by cooperative cutting edges of said blades, means for defining a predetermined infeed path of travel for a web at a predetermined selective angle to the predetermined cut line, means for defining a predetermined discharge path of travel for blanks severed by said blades, means for rotating said blades to selectively vary the predetermined selective angle to thereby selectively alter the angular relationship of the predetermined cut line to the web infeed path of travel whereby blanks of varying sizes, shapes and/or cut line orientation can be severed from a web, and means for transferring each blank from a position adjacent said blades after severance to a position more remote from said blades and to said discharge path of travel through an arc of movement corresponding to at least the predetermined selected angle whereby the blanks are continuously moved to congruent positions of delivery along said discharge path of travel.

2. The apparatus as defined in claim 1 including means for mounting said blades for rotation about an axis which passes through a longitudinal axis of the web when disposed along the web infeed path of travel.

3. The apparatus as defined in claim 1 including means for guiding said blades for rotation through between 45 to 150 degrees.

4. The apparatus as defined in claim 1 including means for limiting said blades for rotation between 45 and 150 degrees.

5. The apparatus as defined in claim 1 including means mounting said transferring means for pivotal movement to effect the travel thereof along its arc movement.

6. The apparatus as defined in claim 1 including means mounting said transferring means for pivotal movement to effect the travel thereof along its arc of movement, said mounting means including a support arm movable in a horizontal plane, said arm having opposite ends, one of said opposite ends being mounted for pivotal movement about a vertical axis, and a second of said opposite ends carrying a receiving element for receiving each blank subsequent to its severance by said blades.

7. The apparatus as defined in claim 1 wherein said transferring means includes a receiving element positioned in general alignment with said predetermined cut line when adjacent said blades, and means for automatically maintaining said receiving element in general alignment with said predetermined cut line at any of said predetermined selective angle thereof.

8. The apparatus as defined in claim 1 wherein said transferring means includes a receiving element positioned in general alignment with said predetermined cut line when adjacent said blades, means for automatically maintaining said receiving element in general alignment with said predetermined cut line at any of said predetermined selective angle thereof, said maintaining means including a vertical pivot for said receiving element and a locating surface against which said receiving element can abut to pivot the same about said vertical pivot into general alignment with said predetermined cut line.

9. The apparatus as defined in claim 1 wherein said transferring means includes a receiving element positioned in general alignment with said predetermined cut line when adjacent said blades and in general alignment with said discharge path of travel when remote from said blades, and biasing means for retaining said receiving element in general alignment with said discharge path of travel.

10. The apparatus as defined in claim 1 wherein said web infeed path of travel and said blank discharge path of travel are linearly aligned with each other and with said blank transferring means when positioned adjacent said blades.

11. The apparatus as defined in claim 1 wherein said web infeed path of travel and said blank discharge path of travel are linearly aligned with each other and with said blank transferring means when positioned adjacent said blades, and means for rotating said blank transferring means along its arc of movement in alternating opposite directions of generally 180 degrees as successive blanks are severed from the web.

12. The apparatus as defined in claim 1 wherein said web infeed path of travel and said blank discharge pathof travel are in generally parallel relationship, and said blank transferring means is rotatable along its arc of movement through generally 180 degrees between said paths of travel.

13. The apparatus as defined in claim 1 wherein said lower blade is disposed above a recess, said transferring means includes a receiving platform, and said receiving platform is accommodated in said recess when said receiving platform is in general alignment with said predetermined cut line.

14. The apparatus as defined in claim 1 wherein said blank discharge path of travel is a chute, said blank transferring means includes a receiving element in alignment with said chute when positioned remote from said blades, and means for pushing each severed blank from the receiving element to the chute.

15. The apparatus as defined in claim 1 wherein said blank transferring means includes a receiving element disposed generally beneath said blades in a first severed blank-receiving position and generally adjacent said blank discharge path of travel in a second position, said blank transferring means further including an arm carrying said receiving element, and means for moving said arm to in turn move said receiving element between the first and second positions thereof.

16. The apparatus as defined in claim 2 including means mounting said transferring means for pivotal movement to effect the travel thereof along its arc of movement.

17. The apparatus as defined in claim 2 including means mounting said transferring means for pivotal movement to effect the travel thereof along its arc of movement, said mounting means including a support arm movable in a horizontal plane, said arm having opposite ends, one of said opposite ends being mounted for pivotal movement about a vertical axis, and a second of said opposite ends carrying a receiving element for receiving each blank subsequent to its severance by said blades.

18. The apparatus as defined in claim 2 wherein said transferring means includes a receiving element positioned in general alignment with said predetermined cut line when adjacent said blades, and means for automatically maintaining said receiving element in general alignment with said predetermined cut line at any of said predetermined selective angle thereof.

19. The apparatus as defined in claim 2 wherein said blank discharge path of travel is a chute, said blank transferring means includes a receiving element in alignment with said chute when positioned remote from said blades, and means for pushing each severed blank from the receiving element to the chute.

20. The apparatus as defined in claim 2 wherein said blank transferring means includes a receiving element disposed generally beneath said blades in a first severed blank-receiving position and generally adjacent said blank discharge path of travel in a second position, said blank transferring means further including an arm carrying said receiving element, and means for moving said arm to in turn move said receiving element between the first and second positions thereof.

* * * * *